Mar. 3. 1925.
1,528,413
A. FREST
FEEDER
Filed Dec. 29, 1923 2 Sheets-Sheet 1
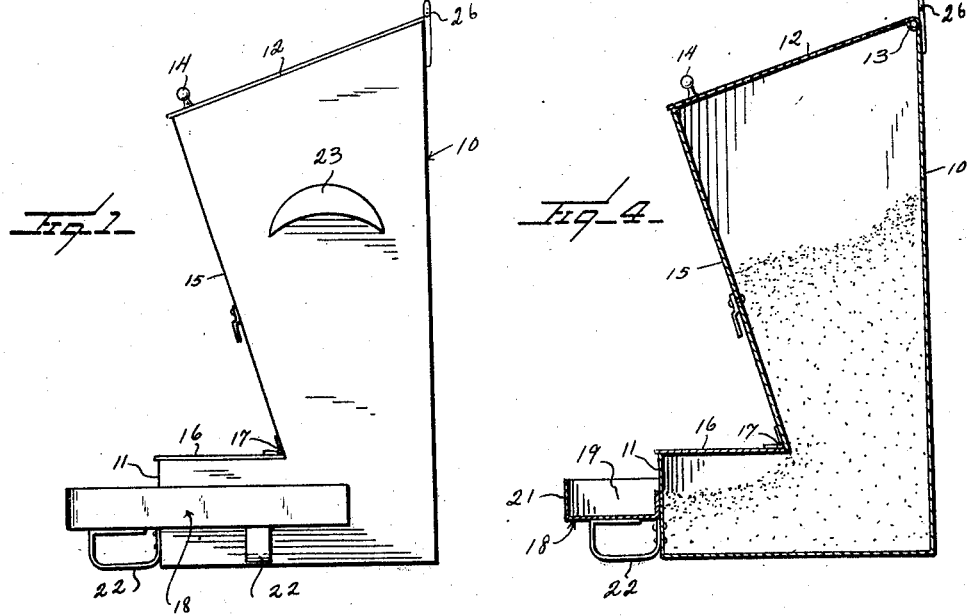
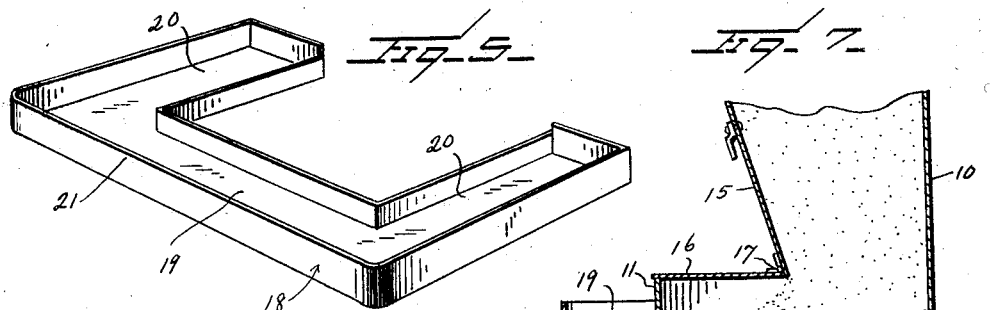
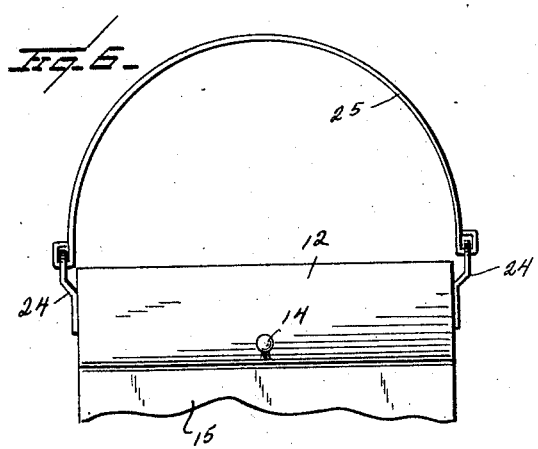
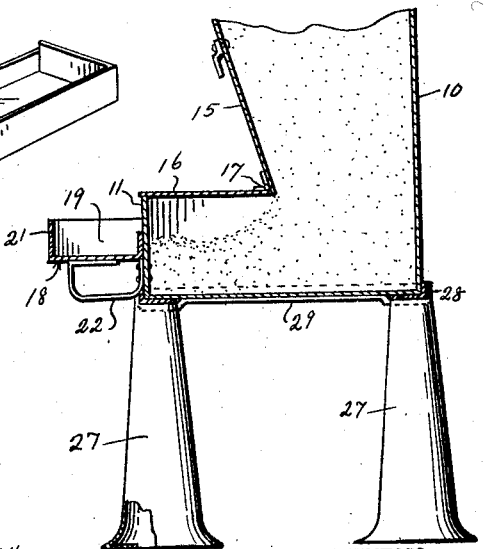
INVENTOR
A. Frest
BY Watson E. Coleman
ATTORNEY.

Mar. 3, 1925. 1,528,413
A. FREST
FEEDER
Filed Dec. 29, 1923 2 Sheets-Sheet 2
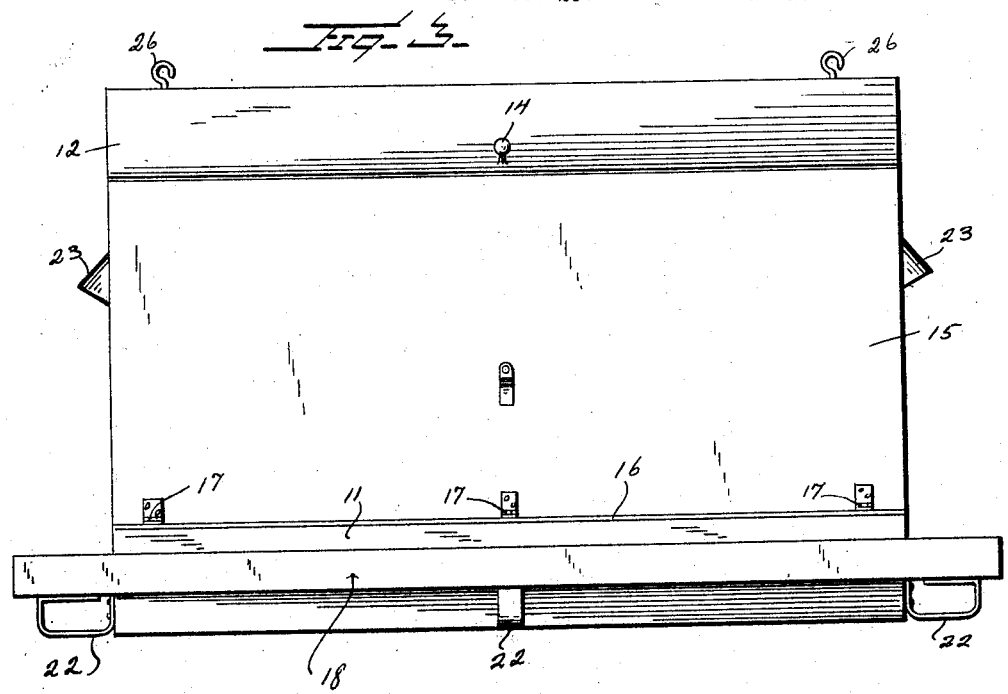
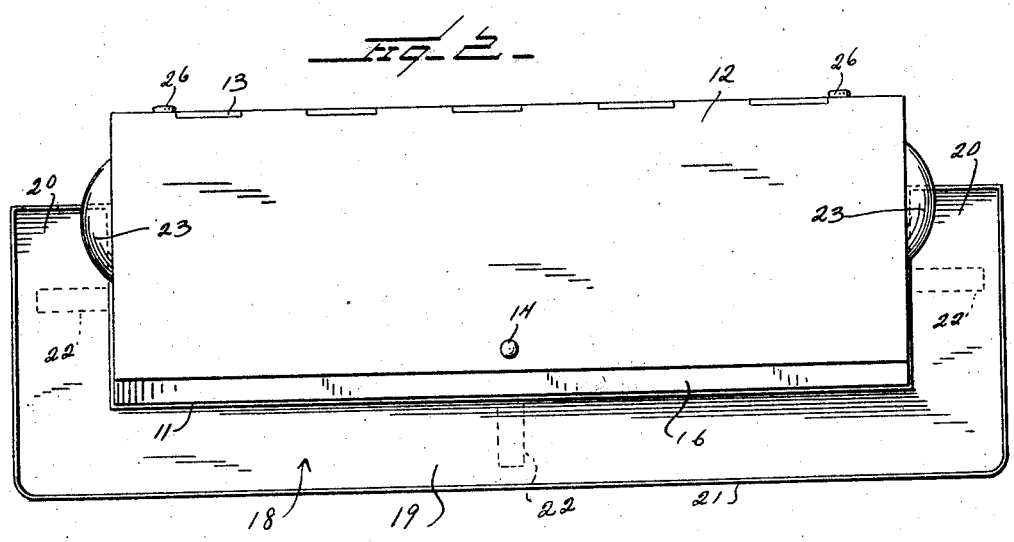
INVENTORS
A. Frest
BY Watson E. Coleman
ATTORNEY.

Patented Mar. 3, 1925.

1,528,413

UNITED STATES PATENT OFFICE.

ANTHONY FREST, OF EAST MOLINE, ILLINOIS, ASSIGNOR OF ONE-FOURTH TO HARRY BARLOW, OF EAST MOLINE, ILLINOIS.

FEEDER.

Application filed December 29, 1923. Serial No. 683,507.

*To all whom it may concern:*

Be it known that I, ANTHONY FREST, a citizen of the United States, residing at East Moline, in the county of Rock Island and State of Illinois, have invented certain new and useful Improvements in Feeders, of which the following is a specification, reference being had to the accompanying drawings.

This invention relates to animal husbandry, particularly to feeders, and has for its object the provision of a novel device for feeding stock of various kinds, an essential feature being the provision of a feed trough supplied by a relatively larger hopper which contains a reserve supply.

An important object is the provision of a feeder which is so constructed that it may stand upon legs or be suspended from a wall or other support so as to be inaccessible to rats, mice or the like, the device being preferably of metal whereby it may be scalded to keep it in a thoroughly sanitary and healthful condition and so that there will be no breeding places afforded for vermin such as lice and the like.

A very important object is the provision of an auxiliary tray which may be suspended from the feeder in case the latter is hung up or which may be formed as a base and equipped with supporting legs, this auxiliary tray extending around the front and sides of the feeder below the feed trough portion thereof for the purpose of catching and saving any feed spilled from the trough, which feed may be subsequently dumped back into the hopper so that all waste will be prevented.

The invention further contemplates the provision of suspension, handle and carrying means of different types depending upon the size of the feeder, together with other details which will constitute a general improvement in the art, a notable feature being that the entire device will be simple and inexpensive to manufacture, and efficient and durable in service.

With the above and other objects and advantages in view, the invention consists in the combination and arrangement of parts to be hereinafter more fully described and claimed and illustrated in the accompanying drawings in which:

Figure 1 is a side elevation of the device.
Figure 2 is a top plan view thereof.
Figure 3 is a front elevation.
Figure 4 is a vertical cross section.
Figure 5 is a perspective view of the auxiliary tray removed.
Figure 6 is a fragmentary front elevation showing the employment of a carrying bail.
Figure 7 is a view showing a modification.

Referring more particularly to the drawings, I have shown the device as comprising a hopper 10 which leads at its lower end into the forwardly extending feed trough 11. The top of the hopper is normally closed by the cover 12 hinged at 13 and provided with a suitable handle 14 facilitating opening for permitting filling with feed. The forward portion of the trough 11 extends beyond the front wall 15 of the hopper and has its top open and adapted to be closed by a door 16 hinged at 17. Any suitable catch device may be provided for holding this door when the device is in actual service.

In conjunction with the above described parts, I provide a tray 18 which, together with all the other parts, is preferably constructed of galvanized iron of suitable gage and which is of substantially U-shape so as to have a front portion 19 extending across the front of the trough 11 and to have end portions 20 located at the sides of the trough. The edges of this tray are formed with outturned flanges 21 to retain any feed which may be spilled from the trough into the tray. Carried by the lower portion of the device are curved arms 22 which engage beneath various points on the tray for holding the same in horizontal position and against displacement.

To facilitate carrying the feeder from place to place, or to permit easy handling for any reason, the sides of the hopper are equipped with handles 23, as shown in Figures 1 and 2, or the sides may instead be equipped with brackets or ears 24 connected by a bail 25, as shown in Figure 6.

In case the device is constructed in a small size for poultry feeding or the like, it is convenient to suspend it from a wall or from a post and for this reason the back of the hopper is equipped at its top with a hook 26 adapted to be engaged over a nail or the like projecting from the wall or post.

When the device is made in larger sizes it is preferable that it be supported by some other means such, for instance, as the legs 27 which are secured on the underside of a frame member 28 forming a seat for the entire device. It is advisable to provide reinforcing plates 29 which are riveted or otherwise secured to the underside of the frame at the points of attachment of the legs thereto, which plates engage beneath the trough for further supporting the device, as shown in Figure 7.

In the operation, it is of course apparent that the feeder is used by filling the hopper either entirely or to as great an extent as desired, and then opening the door 16 to permit the stock to have access to the feeder. Any material spilled out of the trough will accumulate in the tray 18 which may later be dumped into the hopper so that nothing will be wasted. When the device is not in use the cover 12 and door 16 are kept closed so that rats and mice cannot gain access to the contents, a feature which not only prevents waste but also keeps the feed in much better condition for consumption.

While I have shown and described the preferred embodiments of my invention, it is of course to be understood that I reserve the right to make such changes in the form, construction and arrangement of parts as will not depart from the spirit of the invention or the scope of the subjoined claim.

I claim:

In a feeder of the character described, a hopper, a trough at the lower end thereof and projecting beyond the front face, the trough being in free communication with the hopper, a plurality of supporting brackets mounted on the front and sides of the trough, and a tray of U-shape slidably engaged upon the trough in straddling relation thereto and seating upon said brackets, the tray having all of its edges formed with upturned flanges for the retention of spilled feed.

In testimony whereof I hereunto affix my signature.

ANTHONY FREST.